Figure 1:
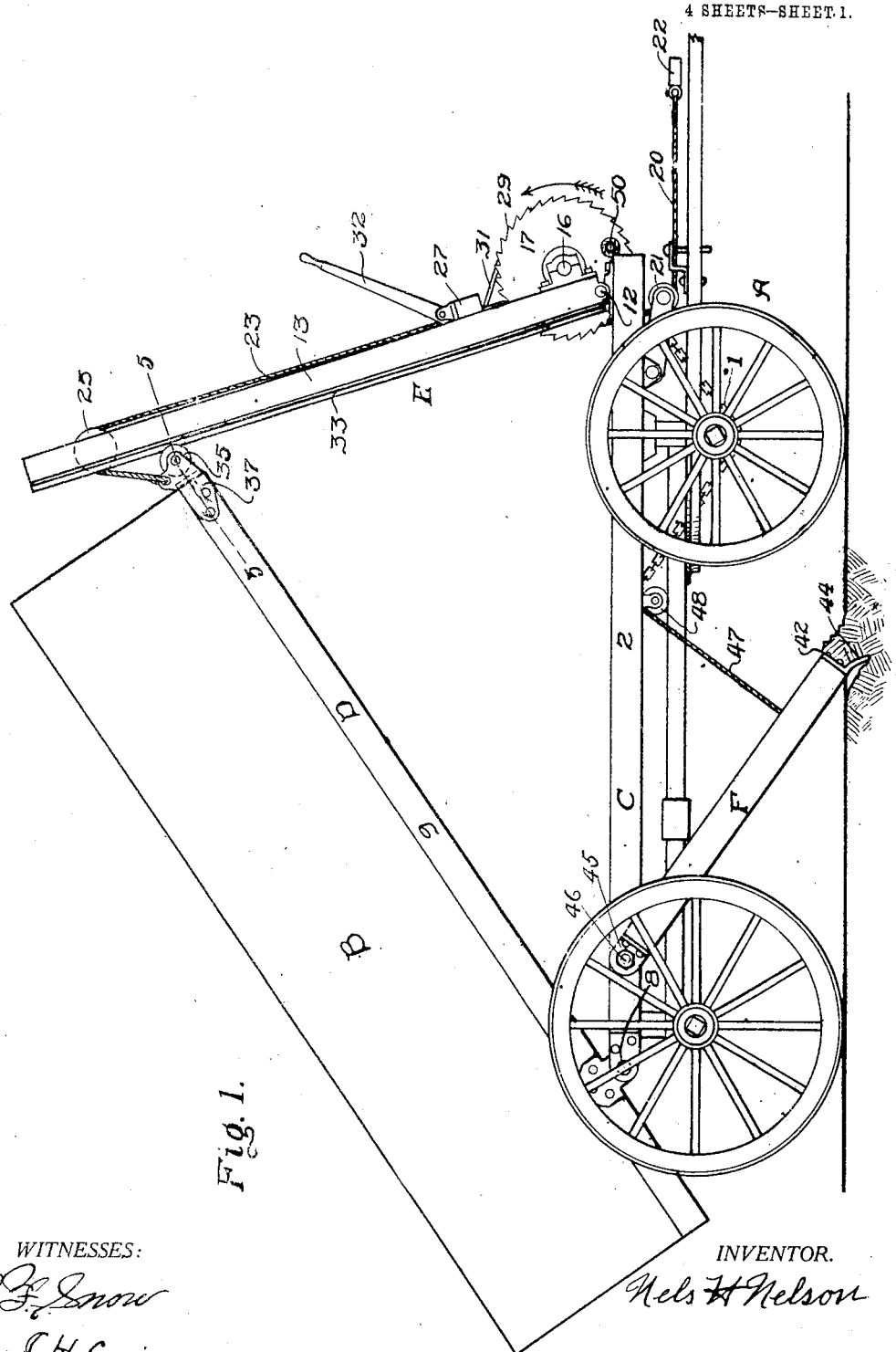

N. H. NELSON.
POWER DUMPING VEHICLE.
APPLICATION FILED MAR. 10, 1909.

976,389.

Patented Nov. 22, 1910.
4 SHEETS—SHEET 1.

WITNESSES:

INVENTOR.
Nels H Nelson

N. H. NELSON.
POWER DUMPING VEHICLE.
APPLICATION FILED MAR. 10, 1909.

976,389.

Patented Nov. 22, 1910.

4 SHEETS—SHEET 3.

WITNESSES:

INVENTOR.
Nels H Nelson

N. H. NELSON.
POWER DUMPING VEHICLE.
APPLICATION FILED MAR. 10, 1909.

976,389.

Patented Nov. 22, 1910.
4 SHEETS—SHEET 4.

WITNESSES:

INVENTOR.
Nels H Nelson

UNITED STATES PATENT OFFICE.

NELS H. NELSON, OF WILLMAR, MINNESOTA.

POWER DUMPING-VEHICLE.

976,389.

Specification of Letters Patent.   Patented Nov. 22, 1910.

Application filed March 10, 1909.   Serial No. 482,611.

*To all whom it may concern:*

Be it known that I, NELS H. NELSON, a citizen of the United States, and a resident of Willmar, county of Kandiyohi, and State of Minnesota, have invented a new and useful Power Dumping-Vehicle, of which the following is a full, clear, concise, and exact specification.

My invention relates to vehicles designed for the transportation of heavy commodities or live stock, and to means for unloading or dumping same.

When hauling heavy commodities by wagon, a considerable time as well as labor is required for unloading by hand. Said expenditure of time and labor may be effectually decreased by providing means for elevating the forward portion and lowering the rear portion of the receptacle in which the commodity is placed, thereby discharging the load rearwardly therefrom by means of gravity. Live-stock are often subject to injury when unloaded from wagons, however, by lowering the rear portion of the wagon box, this difficulty is effectually reduced to a minimum.

In producing devices for the purpose of discharging loads from wagons in the aforestated manner, it has been the universal practice to provide some form of platform upon which the wagon is driven, the horses unhitched, and the entire platform and wagon tilted to a suitable angle for discharging the load by gravity. Devices of this nature are more or less bulky and clumsy, are not easily transported, and require an expenditure of a considerable energy for their operation, owing to the excessive weight elevated. They also require a separate motive agent, such as a horse or a mechanical motor, thereby involving an excessive expense for maintenance as well as the purchase cost.

The object of this invention is to obviate the foregoing disadvantageous conditions, by providing a vehicle with self-contained means for tilting the receptacle in which the load is carried, said means being actuated by the propelling agent of the vehicle. In case the vehicle is transported by horses, means are provided whereby the receptacle is tilted by said horses without disengaging the traces from the double-trees.

The invention is readily applicable to all forms of common horse-drawn wagons, moreover, it may also be utilized to great advantage in connection with any of the various forms of motor-trucks adapted for the transportation of heavy commodities of such nature as would permit unloading by gravity process.

In attaining the object of my invention I provide a simple construction comprising few and durable parts, which may be manufactured and assembled at a comparatively small cost, which is conveniently operated, and which will perform its requisite functions at a high standard of mechanical efficiency.

To enable those skilled in the art, to which my invention appertains, to more fully understand the principles of construction and the many advantages attending the use of same, a self-dumping vehicle embodying my invention is set forth in the following specification and illustrated in the accompanying drawings; however, the actual scope of my invention is more particularly pointed out in the subjoined claims.

Figure 2:
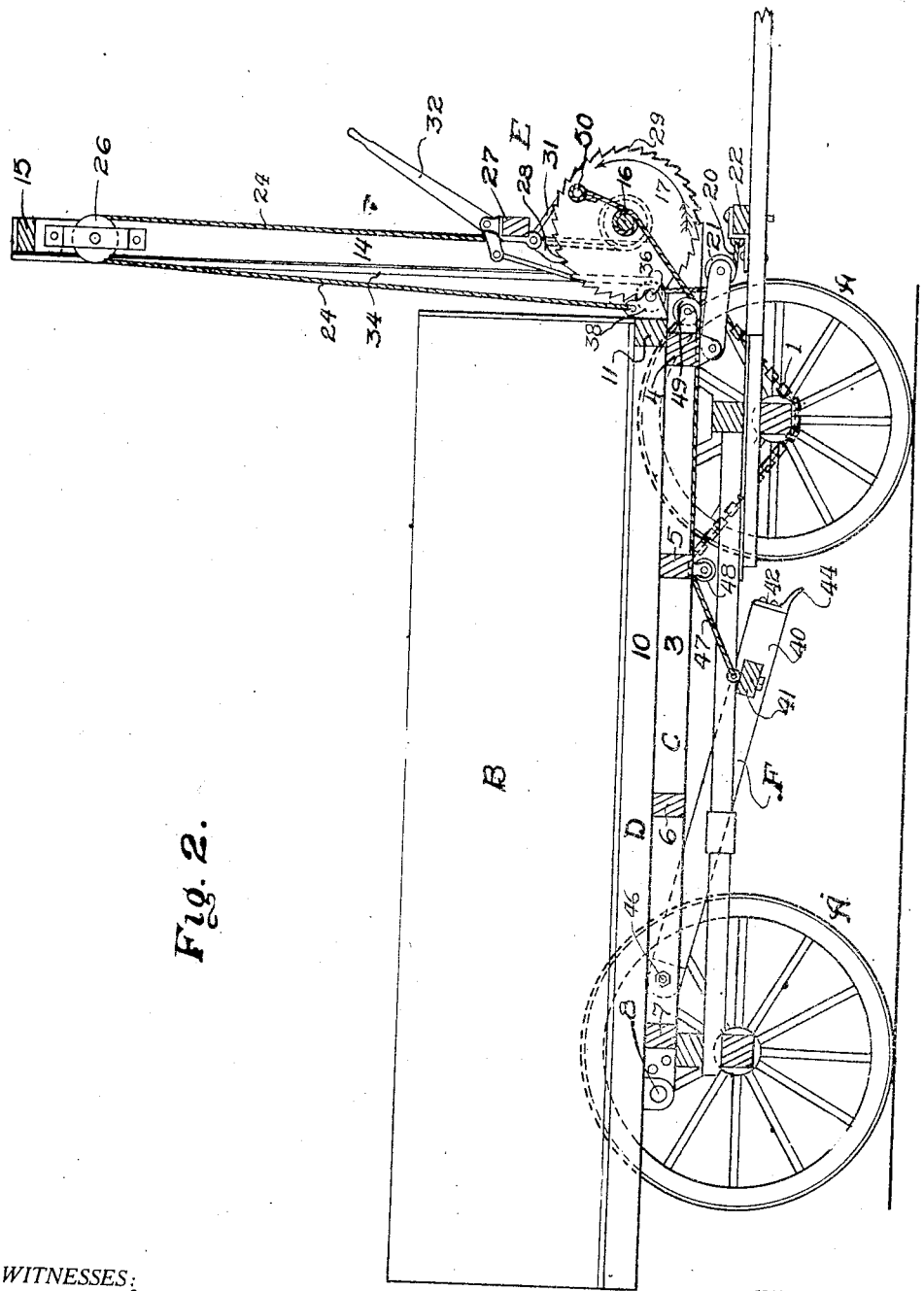
Figure 3:
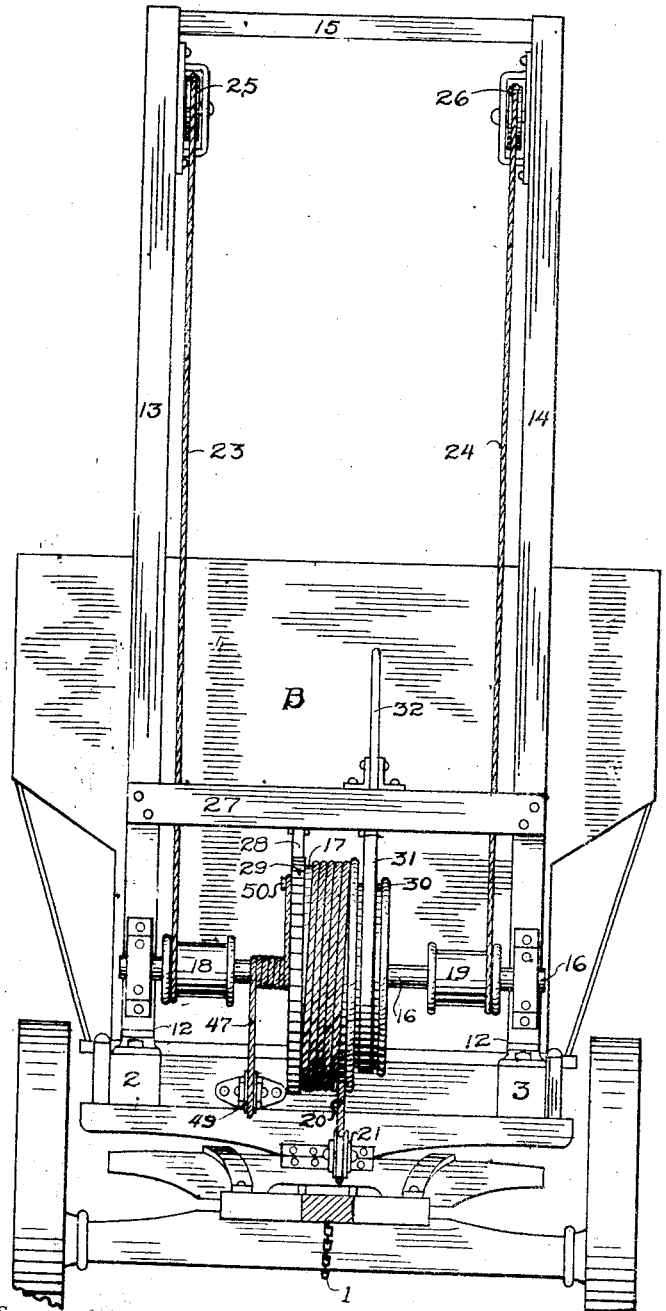
Figure 4:
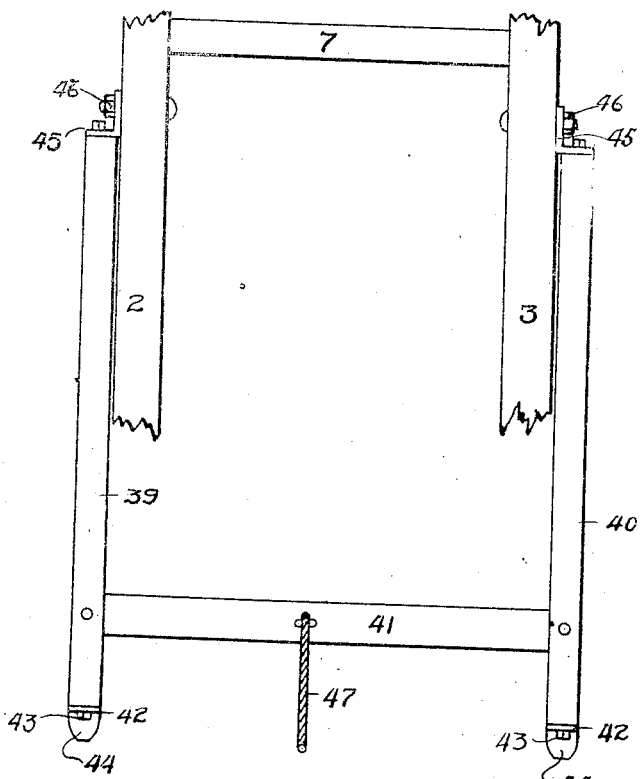
Figure 5:
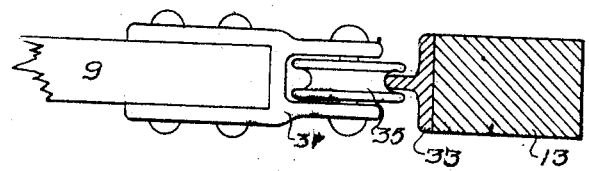
Figure 6:
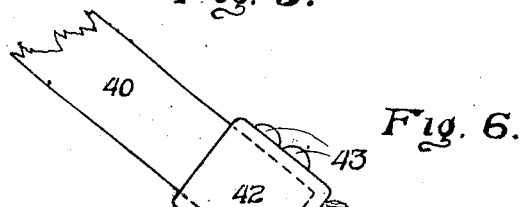

In the drawings: Figure 1 is a longitudinal elevation of a self-dumping vehicle embodying my invention, the receptacle being shown tilted as in position for discharging its load. Fig. 2 is a longitudinal section thereof, the receptacle being shown in horizontal position. Fig. 3 is a detail of the hoisting mechanism, being a front view thereof. Fig. 4 is a detail of the anchor-stay. Fig. 5 is a sectional detail taken on the line 5—5 of Fig. 1. And Fig. 6 is a detail showing a modified construction of the anchor-stay tip.

Referring to the drawings in detail, similar reference characters indicate like parts throughout the specification, and the several views of the drawings.

The wagon proper consists of the usual running gear A, and the receptacle B, which are well known and need no detailed description herein. The receptacle B is shown in form of a grain tank, however, the term "receptacle", as herein used applies to any form of wagon box, coal box, bundle rack, live stock rack, or other appurtenance of like nature. Likewise the wagon gear may be of any desired type.

The main frame C rests upon the bolsters of the running gear, being secured thereto by the chain 1, and consists of the longitudinal stringers 2 and 3, into which are secured suitable transverse beams 4, 5, 6 and 7. The supplementary frame D is secured upon the main frame C by means of pivotal connections 8, and consists of the longitudinal stringers 9 and 10, at substantially the forward portions of which is secured a transverse beam 11. The supplementary frame is of similar gage to the main frame, and depends thereon when in a horizontal position. The design aims to maintain a constant transverse relation between the main frame and the supplementary frame, but allowing perfect freedom of pivotal movements in the vertical plane.

I provide at the front portion of the main frame a hoisting mechanism E for the purpose of elevating the forward portion of the supplementary frame and receptacle, the hoisting frame of which is pivotally secured upon the main frame by means of suitable connections as 12. Said hoisting frame comprises the upright timbers 13 and 14 the upper portions of which are laterally braced by the crown-beam 15.

I provide a transverse shaft 16, rotatively mounted in suitable journals which are secured upon the front faces of the upright timbers 13 and 14, and at substantially their lower portions. The actuating drum 17 is secured upon said shaft 16, being intermediately disposed thereon; and the hoist-drums 18 and 19 are mounted upon said shaft 16, being disposed upon either side of said drum 17 at substantially the extreme portions of said shaft, to which they are rigidly secured for rotation with said actuating drum.

The cable 20 is secured upon the drum 17 from which it extends downwardly passing over the idle sheave 21 whence it extends forwardly and is anchored at the central portion of the double-tree 22. This cable normally remains reeled upon the drum 17; and when unreeled, rotatively impels the drums and shaft as indicated by the arrow. The cables 23 and 24 are secured upon the hoist drums 18 and 19 respectively, and extend upwardly, passing over the sheaves 25 and 26, from which they extend downwardly and are anchored to the extreme forward portion of the supplementary frame D. These cables remain normally extended from their respective reels, and are wound upon said drums, when the cable 20 is extended, drawing up the forward portion of the supplementary frame to a position as indicated in Fig. 1 of the drawings.

A pawl 28 is suspended from the beam 27 and is adapted to engage a ratchet 29, which is preferably formed upon the periphery of the flange of the actuating drum 17, thereby preventing backward movements of the drum 17 until desired. The annular friction rim 30 is mounted upon the shaft 16, and if desired, may be formed integral with the drum 17; and is encompassed by a brake strap 31 which is controlled by the actuating lever 32 pivotally depending upon said transverse beam.

Upon the rear face of the uprights 13 and 14 I provide rails 33 and 34, extending the entire length thereof, and traversed by the anti-friction rollers 35 and 36 which are held in contact therewith by the tension of the cable extending from the uprights to the supplementary frame D. Said anti-friction rollers are mounted in suitable castings 37 and 38, said castings being also provided with eyelets by which the cables 23 and 24 may be conveniently secured thereto.

If desired the supplementary frame may be discarded, and the hinge-plates for the pivot connections 8 and the castings 37 and 38 secured direct upon the receptacle. This would necessitate equipment of various receptacles with these connections; or confine the use of the vehicle to one receptacle. However, the provision of a supplementary frame provides greater convenience for changing receptacles.

An anchor stay F is pivotally secured upon the main frame G; and comprises the longitudinal stays 39 and 40, the forward portions of which are transversely secured by a suitable beam 41. At the forward portions of the stays I provide suitable tips 42, which are secured to the plates by any approved means as bolts 43. Said tips are provided with flukes 44 which extend downwardly and somewhat forwardly therefrom and are adapted to very positively engage the soil. These tips are illustrated as formed of common angle steel, the lower flange of the angle forming the fluke; however, this construction may be modified as shown in Fig. 6 of the drawings, in which the tips are in form of caps inclosing the end portions of the stays, the flukes being formed integral therewith. This modified construction insures greater durability of the stays, but would tend to increase the cost of manufacture.

At the rear portions of the stays, I provide suitable angular plates 45 which are pivotally secured to the stringers 2 and 3 of the main frame by means of bolts 46. The cable 47 is centrally secured upon the beam 41, passes over the idle sheaves 48 and 49, and is provided with a suitable eyelet by which it may be detachably secured upon the pin 50, which is affixed to the drum 17. If desired, the angular plate 45, may be substituted by straight plates, secured upon the side faces of the stays 39 and 40; or if desired suitable castings may be formed completely inclosing the upper end-portions of the stays thereby providing ample protection against a too rapid deterioration of same.

When I desire to discharge a load from the receptacle, I first release the cable 47 from engagement with the pin 50, allowing the anchor-stay F to drop assuming a position as indicated in Fig. 1 of the drawings. I then release the double-tree from connection with the draft-tongue, and drive the horses forward, the arrangement of the cables being such that the unwinding of the drum 17 rotatively impels the shaft 16 in the direction indicated by the arrow in Fig. 2. This rotation causes the drums 18 and 19 to wind up the cables 23 and 24 thereby raising the forward portion of the supplementary frame D, the portion of the receptacle extending to the rear of the pivotal connections 8 being correspondingly lowered. The anchor-stay F, engaging the ground, tends to withhold the vehicle from moving forward in response to the forward exertion of the cable 20. The ratchet 29 is engaged by the pawl 28 thereby retaining the supplementary frame and its receptacle in a tilted position until the load is discharged; after which, the pawl is released, and the brake operated to prevent the supplementary frame from descending too rapidly. To raise the anchor-stay from its operative position, I secure the eyelet of the cable 47 upon the pin 50, the downward momentum of the supplementary frame causes the drum 17 to rotate in opposite direction from that indicated by the arrow, thereby winding the cable 47 upon the shaft 16 and raising the anchor-stay F to a position as indicated in Fig. 2 of the drawings.

In applying this invention to motor-trucks, devices similar to this herein set forth may be provided for raising and lowering the supplementary frame also for actuating the anchor-stay. The cable hoist may be substituted by a traveling-screw or any other approved means. It should be noted however, that this invention provides means whereby the receptacle and its load only are tilted, thereby obviating the excessive expenditure of energy necessary for raising the entire running gear. The invention is self-contained in the vehicle, whereby it may be utilized at any desired point without transporting a dump-jack or other bulky mechanism from place to place. It should be also noted that the mechanism is adapted for operation without unhitching the horses from the double-tree.

It is not to be understood by the term "supplementary frame" that the invention is confined to the use of a supplementary frame and a receptacle detachably secured thereon. The term, as used in the claims, includes any equipollent construction; i. e., the connection of the receptacle direct upon the main frame. Likewise the term "anchor-stay," as herein used, denotes any configuration of device for retarding forward movements of the vehicle during the elevation of the supplementary frame. The construction herein set forth has the advantage of impinging upon the soil direct, whereas, a brake engaging the wheels would not prevent the wheels from sliding over the ground.

It is obvious from the foregoing that variations may be effected, as defined by the scope of the appended claims, without departing from the true and original purport of my invention, therefore I do not confine myself to the details of construction and operation hereinbefore set forth.

Having thus described my invention what I claim and desire to secure by Letters Patent of the United States is the following:

1. In a power-dumping vehicle, the combination with the running gear, of a main frame, a receptacle mounted thereon, mechanism adapted to elevate a portion of said receptacle, an anchor stay adapted for engagement with the ground, and means connecting said anchor stay with said elevating mechanism whereby the downward gravitation of the receptacle is applied for elevating said anchor stay, substantially for the purposes set forth.

2. In a power-dumping vehicle, the combination with the running gear; of a main frame; a receptacle pivotally secured thereon; a hoisting mechanism adapted to elevate a portion of said receptacle; an anchor stay adapted for engagement with the ground; and means connecting said anchor stay with said hoisting mechanism whereby the downward gravitation of the receptacle, when lowered to a horizontal position, is utilized to effect the disengagement of said anchor stay from the ground, substantially for the purposes set forth.

3. In a self-dumping vehicle, the combination with the running gear, of a main frame, a supplementary frame pivotally secured thereon, a hoist-frame mounted upon the forward portion of said main frame, hoist drums mounted in said hoist-frame, an actuating drum mounted to rotate with said hoist-drums, a cable connecting said actuating drum with the double-tree, means operatively connecting said hoist drums to the forward portion of said supplementary frame, an anchor-stay pivotally mounted in said main frame and provided with flukes adapted to engage the soil, a cable secured upon said anchor-stay and detachably secured to said actuating drum whereby the downward momentum of the supplementary frame when lowered is applied for raising the anchor-stay, substantially for the purposes set forth.

4. In a self-dumping vehicle, the combination with the running gear, of a main frame; a supplementary frame pivotally secured thereto; a hoist mechanism mounted upon the forward portion of said main frame adapted to tilt the supplementary frame; an anchor-stay pivotally secured upon said main frame having suitable flukes adapted to impinge the ground; and means operatively connecting said anchor stay to the hoisting mechanism whereby the downward momentum of the supplementary frame, when being lowered, is utilized for raising said anchor stay from engagement with the soil; substantially for the purposes set forth.

In testimony whereof, I have hereunto set my hand and affixed my seal in the presence of two subscribing witnesses.

NELS H. NELSON. [L. S.]

Witnesses:
CHARLES JOHNSON,
R. W. STANFORD.